Dec. 27, 1966   J. F. CAMPESE   3,294,343
AUTOMATIC RESTAURANT
Original Filed July 14, 1965   6 Sheets-Sheet 1

FIG. I.

INVENTOR.
JOSEPH F. CAMPESE
BY
*Walter F. Wessendorf Jr.*
*Attorney*

Dec. 27, 1966   J. F. CAMPESE   3,294,343
AUTOMATIC RESTAURANT
Original Filed July 14, 1965   6 Sheets-Sheet 2

INVENTOR.
JOSEPH F. CAMPESE
BY
Walter F. Wessendorf Jr
attorney

INVENTOR.
JOSEPH F. CAMPESE
BY

Dec. 27, 1966 J. F. CAMPESE 3,294,343
AUTOMATIC RESTAURANT
Original Filed July 14, 1965 6 Sheets-Sheet 4

INVENTOR.
JOSEPH F. CAMPESE
BY
*Walter F. Wessendorf Jr.*
*attorney*

Dec. 27, 1966                J. F. CAMPESE                3,294,343
AUTOMATIC RESTAURANT
Original Filed July 14, 1965                                6 Sheets-Sheet 5

INVENTOR.
JOSEPH F. CAMPESE
BY
*Walter F Wemersloyh*
*attorney*

Dec. 27, 1966  J. F. CAMPESE  3,294,343
AUTOMATIC RESTAURANT
Original Filed July 14, 1965  6 Sheets-Sheet 6
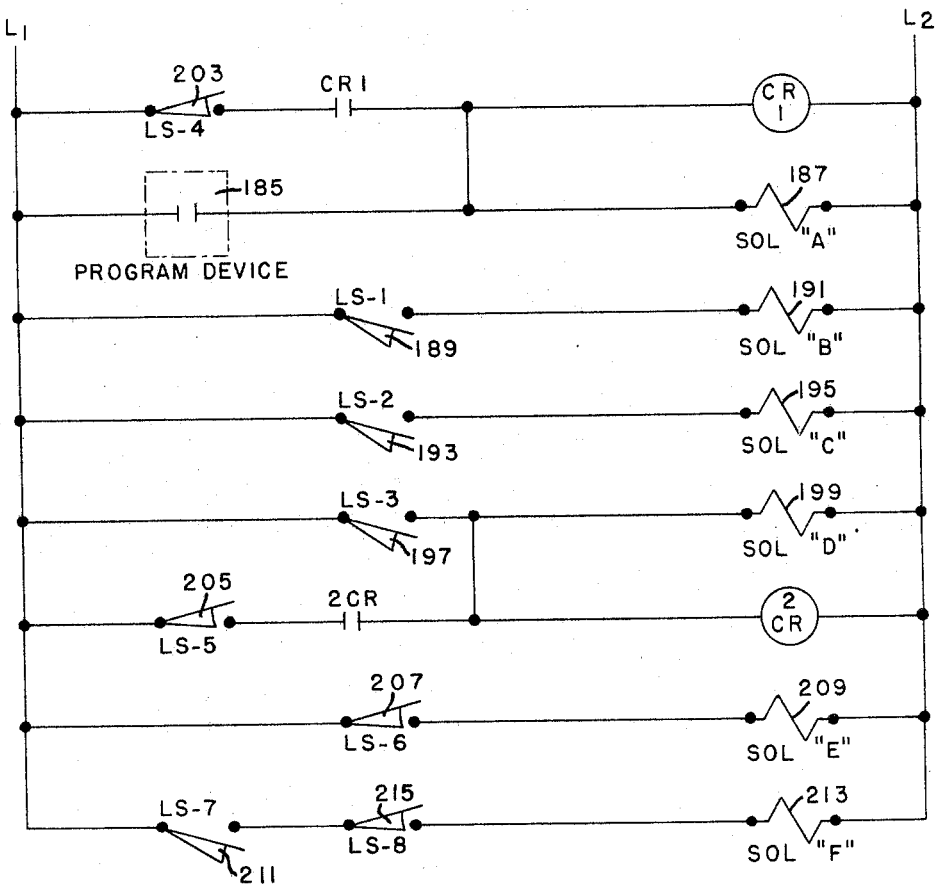
FIG. II.
INVENTOR.
JOSEPH F. CAMPESE
BY

United States Patent Office 3,294,343
Patented Dec. 27, 1966

3,294,343
AUTOMATIC RESTAURANT
Joseph F. Campese, Latham, N.Y., assignor to Walter F. Wessendorf, Jr., Guilderland, N.Y.
Continuation of application Ser. No. 475,313, July 14, 1965. This application Mar. 18, 1966, Ser. No. 543,464
3 Claims. (Cl. 243—29)

This application is a continuation of my copending application Serial No. 475,313, filed July 14, 1965, and now abandoned.

This invention relates to an automatic restaurant.

The object of this invention is to provide a bank of refrigerated trucks having a plurality of removable racks, each housing a serpentine shaped loading duct in which are stored frozen packages of one particular type of food such as vegetables, potatoes, meats, etc. In the restaurant proper the customer would deposit the required money at an electronic heating unit and select the food of his choice. These packages of food selected would be conveyed from the trucks to the heating unit where the food would be quickly heated.

The invention permits a variety of foods to be prepared of uniform high quality at a central supply point. After the supply of a particular type of food has been depleted, another rack of that type of food may be joined into the distribution system. When the supply of food is low another truck may be loaded and dispatched from the central supply point to the restaurant and joined into the distribution system to provide a new supply of food.

Further attributes of the invention are to permit a variety of foods to be prepared, packaged, frozen and then loaded into the ducts housed in racks at the central warehouse. Of further significance to the restaurant proper would be the reduction of personnel conventionally needed for the preparation and service of food, the accompanying costs saved including the capital investment required for conventional kitchens.

The overall benefit of the invention is realized when the customer is able to order a complete hot meal of his choice without any significant waiting time required and at a price that will reflect a measureable saving over conventional restaurant prices.

These and other objects of the invention should be appreciated from the detailed specification taken in conjunction with the drawings, in which like reference numerals refer to similar parts throughout the several views, in which:

FIG. 11 is a circuit diagram of the control devices for the invention.

Figure 1:
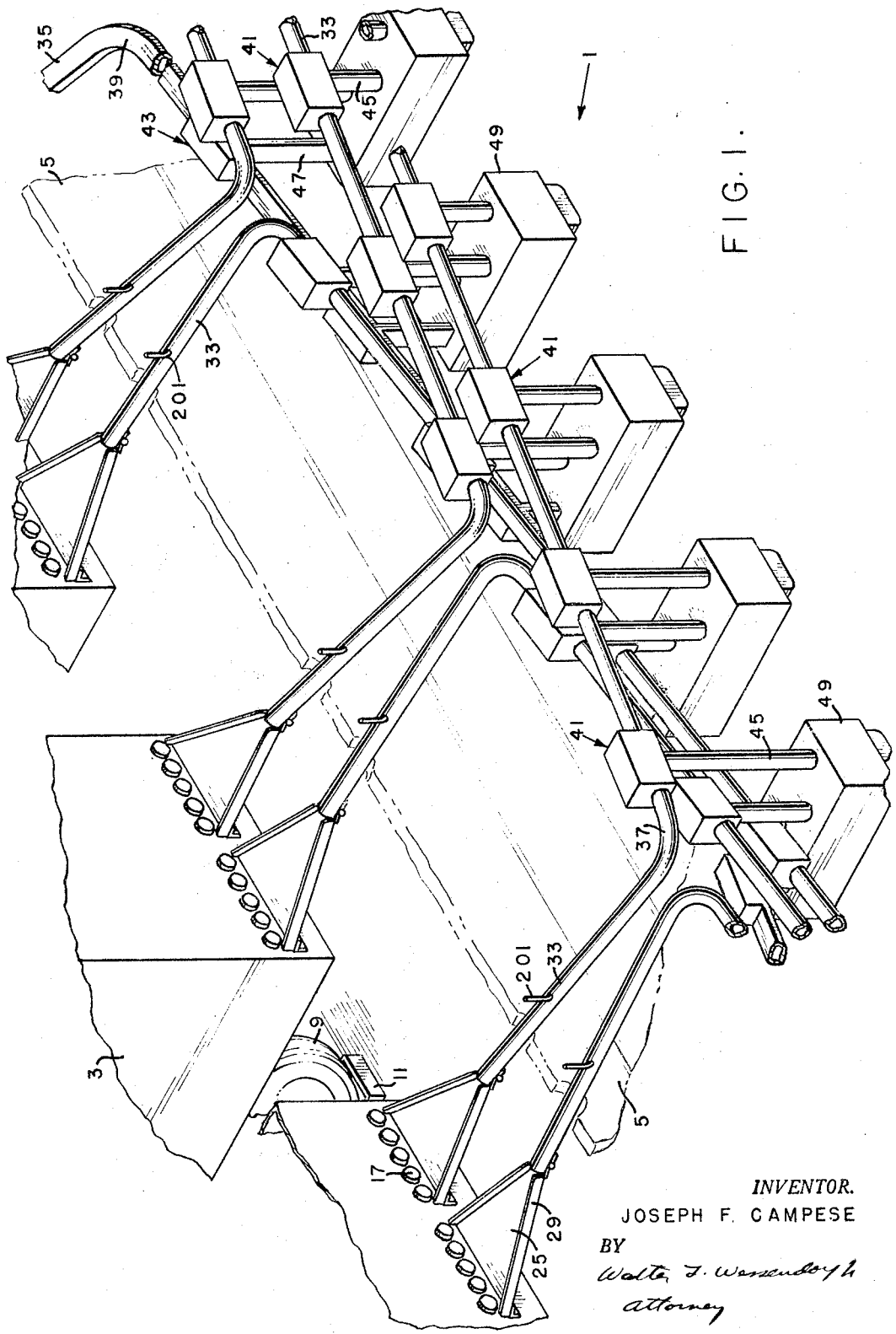
FIG. 1 is a perspective view of the invention.
Figure 2:
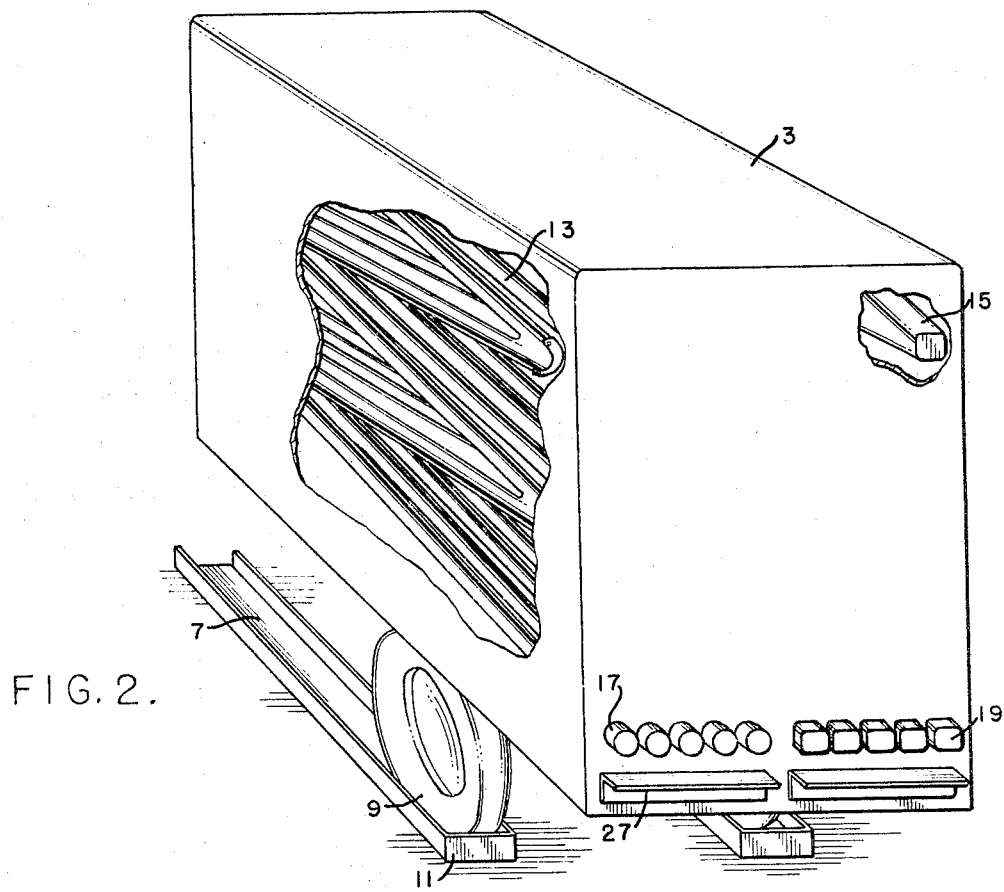
FIG. 2 is a perspective view of a truck.

In FIG. 1 reference numeral 1 generally refers to the invention. Trucks 3 are shown parked ouside the rear wall 5 of the restaurant with aligning tracks 7, shown more discernably in FIG. 2, receiving wheels 9 of truck 3 and abutting turned up end ports 11.

Within each refrigerated truck 3 may be received both serpentine configurated loading ducts 13 or 15 at the discharging ends of which are removable end caps 17 and 19, respectively. Duct 13 is used for storing frozen packages 21 of vegetables, potatoes, etc. and duct 15 is used for storing frozen packages 23 of meats.

Figure 3:
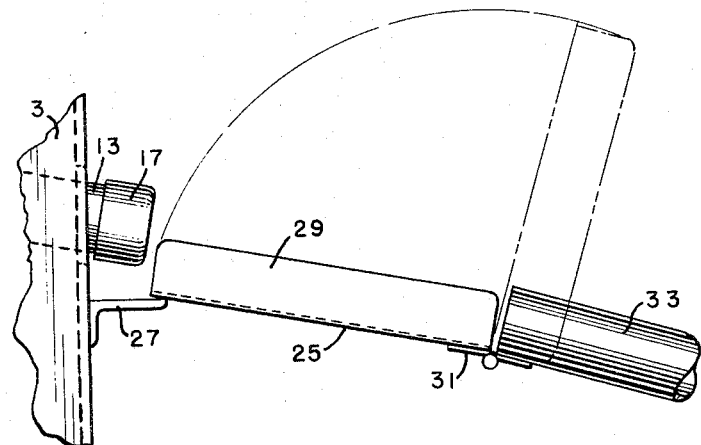
FIG. 3 is a fragmentary side view of a loading duct, chute and conveying duct.

Upon controlled release from the discharged end of loading duct 13 or 15 the respective package 21 or 23 will be dropped onto conveying chute 25 with its free end resting upon ledge bracket 27 secured to truck 3 located beneath the loading ducts as shown more discernably in FIG. 3.

Chute 25 is triangularly configured and has upturned sides 29. A hinge 31 secured to the conveying duct 33 or 35 and to the bottom of chute 25 allows the chute 25 to be raised upwardly and abut against the receiving end of the conveying chute when not in use.

The conveying ducts 33 and 35 are arranged to be pitched downwardly to allow by means of gravity the movement therein or respective packages 21 and 23. The respective elbows 37 and 39 permit a gradual right angle turn of the moving packages to the respective down drop dampers 41 and 43 with discharge of the packages thereat within vertically arranged respective down drop ducts 45 and 47 connected with electronic heating units 49.

Each heating unit 49 has connected therewith one assembly of a conveying duct 35, damper 43 and down drop duct 47 for conveying thereto meat packages 23 and three separate assemblies of conveying duct 33, damper 41 and down drop duct 45 for conveying thereto packages 21.

Figure 4:
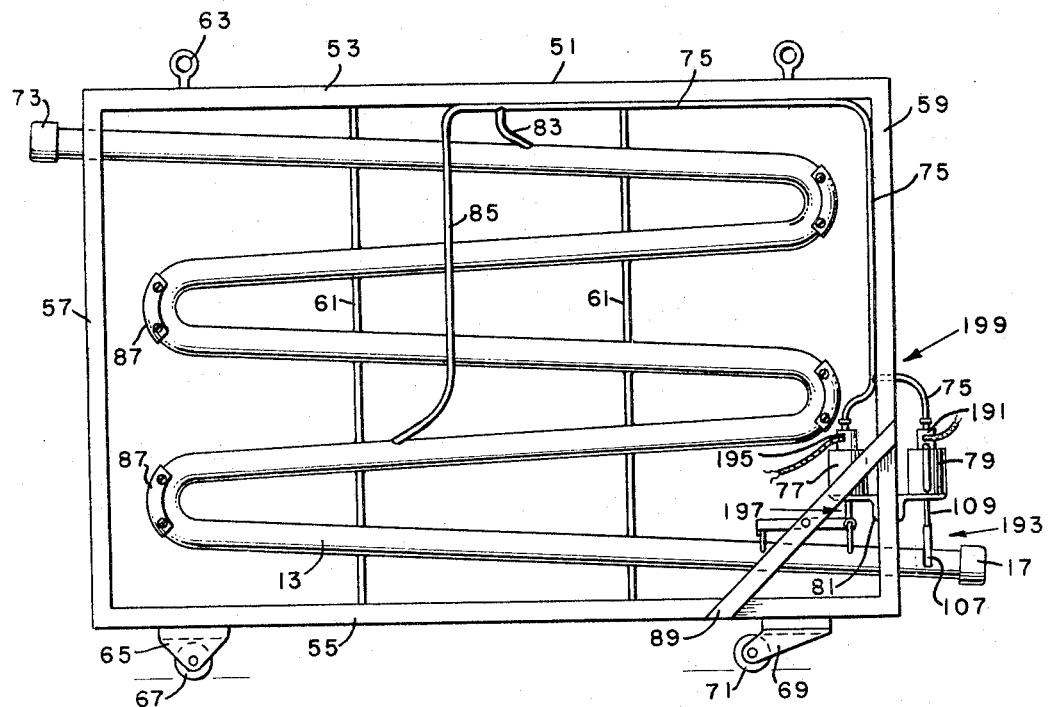
FIG. 4 is a side view of a rack showing the loading duct housed therein.
Figure 5:
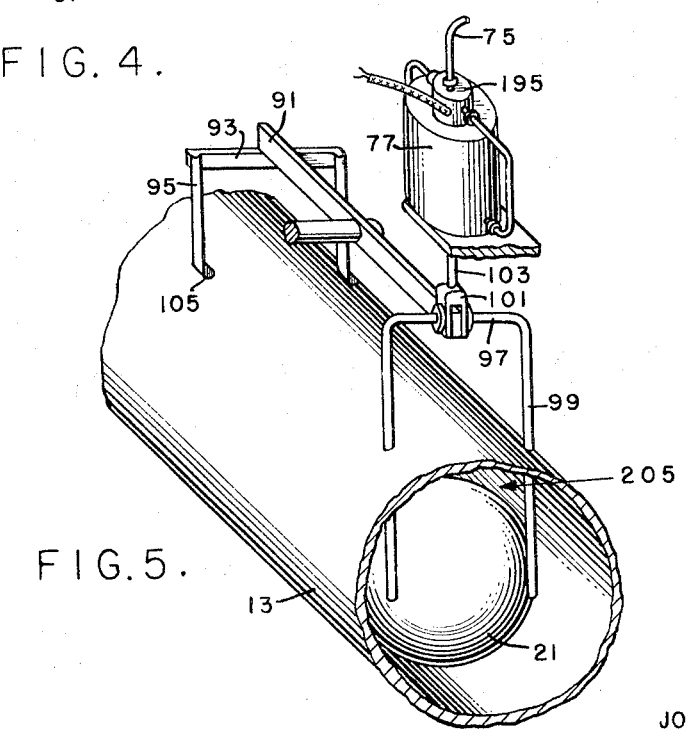
FIG. 5 is a fragmentary perspective view of a loading duct showing the package therein contained and the control for same.

FIG. 4 shows the rack 51 that is used to house both of the ducts 13 and 15. Rack 51 comprises an upper member 53, lower member 55, left side member 57 and right side member 59 welded or suitably secured together with structural rigidity provided by two internal members 61 suitably secured to upper and lower members 53 and 55. Two hooks 63 secured to upper member 53 are provided to facilitate removal and replacement of the rack 51 in the truck 3. Further facilitation is provided by two depending brackets 65 and 69 which freely mount their respective casters 67 and 71. External of rack 51 a removable filler cap 73 is provided for duct 13.

An input air supply is conducted by means of tubing 75 to each of the fluid motors 77 and 79 mounted on bracket 81 fixed to member 59. A separate source of input air supply (not shown) is conducted by tubing 75 to upper tubing branch 83 and lower tubing branch 85 to the internal portions of duct 13 for purposes of defrosting the duct and to provide air pressure as an additive force component to move the packages downwardly in the duct. Removably secured to duct 13 are clean out covers 87 providing access to the internal duct for cleaning or removing obstructions contained therein.

Bracket 89 secured to members 55 and 59 pivotally mounts in the bight portion thereof arm 91 having at one end cross member 93 rigidly secured therewith and integral fingers 95 depending therefrom. The other driven end of arm 91 is pivotally mounted on cross member 97 having integral fingers 99 depending therefrom. Clevis 101 pivotally mounted on cross member 97 is suitably secured to the driving piston rod 103 of fluid motor 77. Two slots 105 formed in the wall of duct 13 are provided for each finger 95 to allow free movement therein upon reciprocation of piston rod 103.

As arranged and constructed, upward movement of piston rod 103 releases fingers 99 from their retention of package 21 in tube 13 while at the same time moving fingers 95 forwardly and downwardly to engage and move package 21 within duct 13. Downward movement of piston rod 103 effects the return of fingers 99 to the original position where package 21 is retained in duct 13, while at the same time fingers 95 will return upwardly to the position allowing package 21 to slide underneath.

Upon further travel within duct 13 package 21 will abut a hemispherically configured gate 103 reciprocable within a semi-circular slot formed within the top portion of the wall of duct 13. Gate 107 is clevis mounted to piston rod 103 reciprocated by fluid motor 79. Upward movement of gate 107 allows the package 21 to slide through duct 13 and drop from the end of same onto conveying chute 25.

Figure 6:
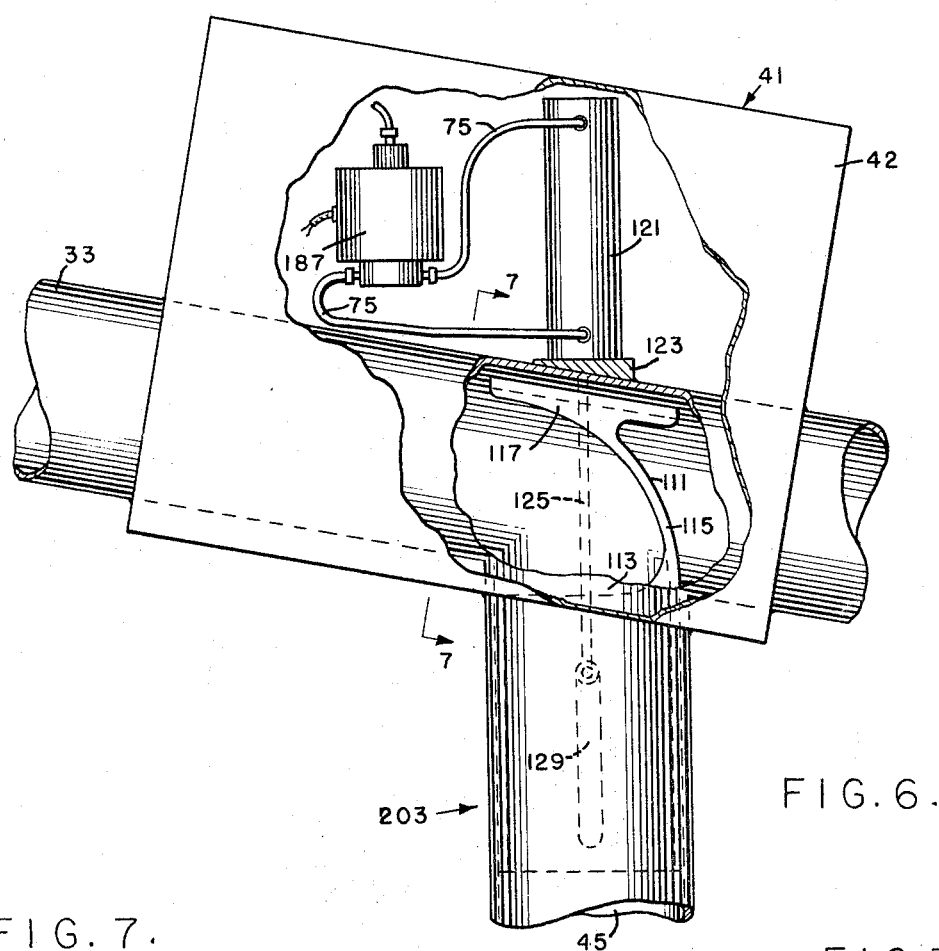
FIG. 6 is a fragmentary side view, partly in section, of the conveying duct, down drop duct and damper utilized with same.
Figure 7:
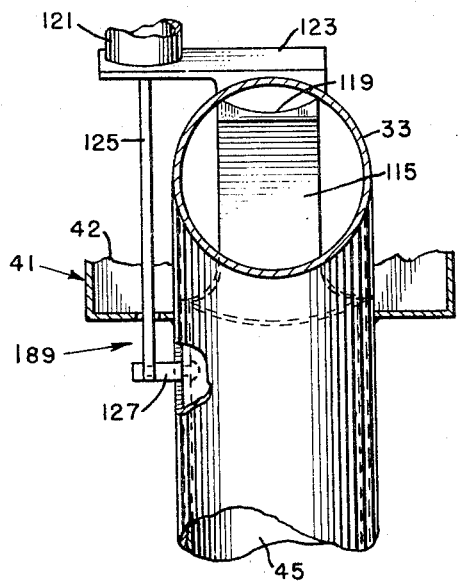
FIG. 7 is a view taken along the line 7—7 of FIG. 6.

The down drop damper assembly referred to by reference numeral 41 is shown more discernably in FIGS. 6 and 7. The assembly is substantially housed within housing 42. Reciprocating within down drop duct 45 is damper member 111 having a lower cylindrical portion 113 received in down drop duct 45 and the upper part of cylindrical portion 113 is narrowed into an arcuately configured web extending into the internal portion of duct 33. Web 115 terminates in a channel member 117 whose width and length are similar to the dimensions of a slot (not shown) formed in the bottom of duct 33 that upon complete downward movement of channel member 117 will align the arcuately configured top portion 119 formed to member 117 with the internal arcuate surface of duct 33 to allow unrestricted travel of package 21 from the left side of duct 33 over member 117 to the right side of duct 33.

Damper member 111 moved upwardly to its fullest extent, as shown in FIG. 6, will present web 115 to the package 21 and direct same downwardly into down drop duct 45.

Fluid motor 121 offsetly mounted on bracket 123 secured to duct 33 has a piston rod 125 reciprocating the lower cylindrical portion 113 by means of a pin 127 secured to portion 113 and piston rod 125 and guided by a slot 129 formed in down drop duct 45.

Figure 7A:
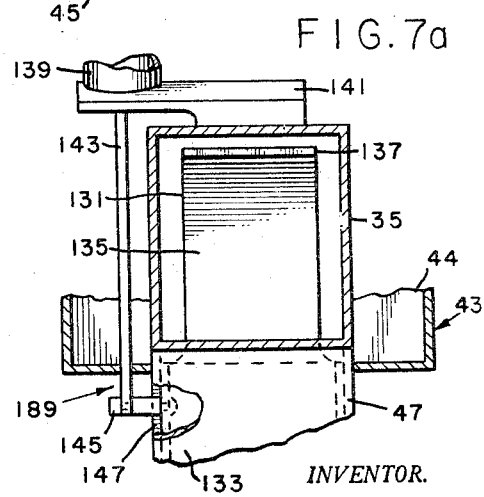
FIG. 7a is a sectional view as it would appear at the meat conveying duct, meat down drop duct and meat down drop damper if taken along a line similar to the line 7—7 of FIG. 6.

In FIG. 7a is shown damper assembly 43 substantially housed in its housing 44. Damper member 131 has a lower portion 133 received and reciprocable within down drop duct 47 and the upper part of lower portion is narrowed into an arcuately configured web 135 extending into duct 35. Web 135 terminates in a channel member 137 whose width and length are similar to the dimensions of a slot (not shown) formed in the bottom of duct 35 that upon complete downward movement of channel member 137 will align flat shaped member 137 with the bottom surface of duct 35 to allow unrestricted travel of package 23 from the left side of duct 35 over member 137 to the right side of duct 35.

Damper member 131 moved upwardly to its fullest extent as shown in FIG. 7a, will present web 135 to the package 23 and direct same downwardly into down drop duct 47.

Fluid motor 139 (partially shown) offsetly mounted on bracket 141 secured to duct 35 has a piston rod 143 reciprocating the lower portion 133 by means of a pin 145 secured to lower portion 133 and piston rod 143 and guided by a slot 147 formed in down drop duct 47.

Figure 8:
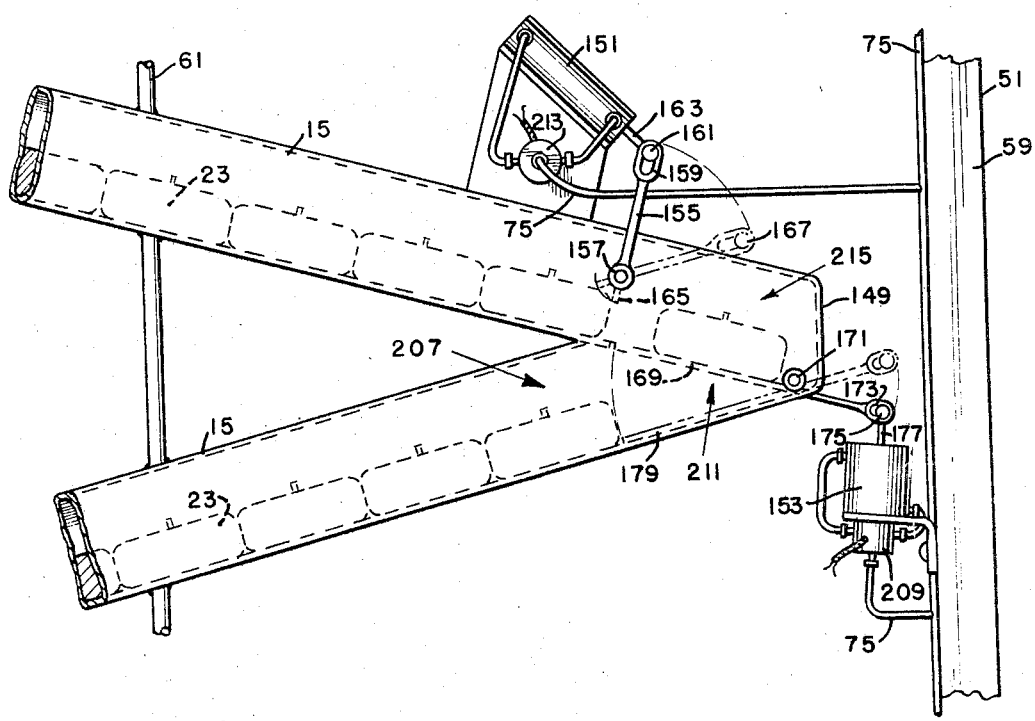
FIG. 8 is a fragmentary side view of the meat loading duct and control for same.

In FIG. 8 is shown serpentine shaped loading duct 15 housed by rack 51. Duct 15, as well as ducts 35 and 47, is substantially square shaped in cross-section. At each bend 149 where the upper level of duct 15 joins with the lower level are emplaced fluid motors 151 and 153, connected to the air supply by tubing 75.

Lever 155 pivotally mounted at 157 has at one end a slot 159 formed which is engaged by pin 161 carried by reciprocating piston rod 163 and at the other end lever 155 has a finger 165. Finger 165 retains package 23 in the duct 15 and at position 167 the finger 165 will be released to allow package 23 to move within duct 15. After package 23 slides by the finger 165 in its position 167, the piston rod 163 will be reciprocated to return finger 165 to its position 167 where another package 23 will be retained in duct 15.

The package 23 will slide onto a lever plate 169 pivotally mounted in the bight portion thereof at 171 and which lever plate 169 has formed at one end a slot 173 engaged by pin 175 carried by reciprocating piston rod 177 of fluid motor 153. The dimensional length and width of lever plate 169 is similar to the length and width of the space formed by joining the upper and lower levels of duct 15 in the bend 149. Upward reciprocation of piston rod 177 will lower plate 169 to its position 179 where the package 23 will slide by force of gravity from plate 169 down the lower level of duct 15.

Not shown, are the fluid motors 77 and 79 and their respective assemblies which are incorporated into duct 15 in the location of the discharge of package 23 onto conveying chute 25. Fluid motors 77 and 79 and their respective assemblies function the same way with package 23 in duct 15 as with package 21 in duct 13.

Figure 9:
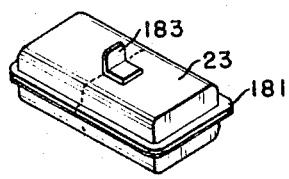
FIG. 9 is a perspective view of an individual meat package.

In FIG. 9 is shown the package 23 for an individual serving portion of meat which is a rectangularly shaped housing with a removable sealing strip 181 around the mid portion with a flag 183 upstanding from the top portion of package 23 to trip limit switches as hereinafter described.

Figure 10:
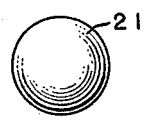
FIG. 10 is a view of the package utilized for vegetables, potatoes, etc.

In FIG. 10 is shown the package 21 which contains an individual serving portion of a particular vegetable, or potato. Package 21 is round in shape.

In FIG. 11 is shown the circuit diagram for controlling the operating of the automatic restaurant. A program device 185 is associated with each one of the variety of foods stored in the loading ducts 13 and 15. When an individual customer deposits money at his heating unit 49 and makes his selection of food, his selection will quickly be conveyed to the heating unit 49 to be cooked.

Actuation of the program device 185 energizes solenoid 187 (SOL "A") to actuate a valve of fluid motor 121 or 139 reciprocating piston rod 125 or 143 upwardly with carried pin 127 or 145 tripping limit switch 189 (LS–1) arranged in the proximity of pin 127 or 145 as indicated. The limit switches are of conventional construction and their locations are designated by reference numerals.

Tripped limit switch 189 closes the circuit and solenoid 191 (SOL "B") is energized to actuate a valve of fluid motor 79 to reciprocate upwardly pistons rod 109 and gate 107 tripping limit switch 193 (LS–2) energizing solenoid 195 (SOL "C") to actuate a valve of fluid motor 77 to reciprocate piston rod 103 upwardly and eject a food package downwardly along the loading duct and onto conveying chute 25.

Cross-member 97 carried by piston rod 103 upwardly in this reciprocation trips limit switch 197 (LS–3) energizing solenoid 199 (SOL "D") to actuate a valve to turn on the separate air supply to tubing branches 83 and 85 and to tubing branch 201 located on the conveying duct 33 or 35 for purposes as previously described.

Package 21 or 23 directed downwardly into down drop duct 45 or 47 by web 115 or 135 will trip limit switch 203 (LS–4) energizing solenoid 187 to actuate a valve of fluid motor 141 or 139 to reciprocate piston rod 125 or 143 downwardly tripping limit switch 189 energizing solenoid 191 to actuate a valve of fluid motor 79 to reciprocate piston rod 109 and gate 107 downwardly.

This downward movement of gate 107 trips limit switch 193 energizing solenoid 195 actuating a valve of fluid motor 77 reciprocating piston rod 103 downwardly to allow a package 21 or 23 to move along duct 13 or 15, but retained therein by fingers 99. Movement of the package from fingers 95 to 99 trips limit switch 205 (LS–5) located therein between energizing solenoid 199 to actuate a valve to turn off the separate air supply to tubing branches 83, 85 and 201.

In each lower level of duct 15 is located a limit switch 207 (LS-6) tripped by flag 183 of package 23 in moving from lever plate 169 to the lower level of duct 15 and energizing solenoid 209 (SOL "E") actuating a valve of fluid motor 153 reciprocating piston rod 177 downwardly to thereby raise lever plate 169 to the upper level of duct 15.

As plate 169 is raised to the upper level of duct 15 a limit switch 211 (LS-7) is tripped energizing solenoid 213 (SOL "F") to actuate a valve of fluid motor 151 to reciprocate piston rod 163 downwardly releasing finger 165 from package 23 which slides onto plate 169 with flag 183 of package 23 tripping limit switch 215 (LS-8) actuating a valve of fluid motor 151 reciprocating piston rod upwardly to return finger 165 to its retaining position for the next package 23.

Also shown in FIG. 11 are two relays utilized as safety devices in the energization of the solenoids. The contacts of the one relay are designated CR1 and its coil CR1 enclosed in a circle. The contacts of the other relay are designated 2CR and its coil 2CR enclosed in a circle.

Having thusly described my invention, I claim:

1. A down drop damper assembly for use with a conveying duct and a down drop duct for movement of a package horizontally along a horizontally disposed conveying duct or movement of said package in a downward direction through a vertically disposed down drop duct, said down drop damper assembly comprising a damper member, said damper member being disposed interiorly of said conveying duct and said down drop duct, said damper member having a lower portion, web and channel member, said web being intermediate said lower portion and channel member, said lower portion being received and reciprocable within said down drop duct, said channel member upon complete downward movement of said damper member allowing unrestricted travel of said package from one side of said conveying duct over said channel member to the other side of said conveying duct, and said web upon movement of said damper member upwardly to its fullest extent directing said package downwardly into said down drop duct, and means to move said damper member upwardly and downwardly.

2. A down drop damper assembly in accordance with claim 1, wherein said web is arcuately configured.

3. A down drop damper assembly in accordance with claim 1, wherein said moving means comprises a piston rod and a fluid motor, wherein said piston rod is operatively connected to said damper member, and wherein said fluid motor operatively controls the reciprocation of said damper member.

References Cited by the Examiner

UNITED STATES PATENTS

| | | | |
|---|---|---|---|
| 307,437 | 11/1884 | Clay | 243—29 |
| 3,139,932 | 7/1964 | Johnson | 243—30 |

EVON C. BLUNK, *Primary Examiner.*

H. C. HORNSBY, *Assistant Examiner.*